(12) United States Patent
Takahashi et al.

(10) Patent No.: US 8,042,860 B2
(45) Date of Patent: Oct. 25, 2011

(54) DOOR STRUCTURE FOR VEHICLE (75) Inventors: Tomoki Takahashi, Hiroshima (JP);
Ryuji Nonaka, Aki-gun (JP); Hisatoshi Kinoshita, Aki-gun (JP); Keisuke Kondou, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 136 days.

(21) Appl. No.: 12/606,902

(22) Filed: Oct. 27, 2009

(65) Prior Publication Data
US 2010/0148535 A1    Jun. 17, 2010

(30) Foreign Application Priority Data
Dec. 15, 2008  (JP) .................................. 2008-317906

(51) Int. Cl.
*B60J 5/00*    (2006.01)
(52) U.S. Cl. .................................................... 296/146.6
(58) Field of Classification Search ............... 296/146.6, 296/146.9, 187.3, 187.12, 202; 293/120, 293/122; 280/730.2, 735, 728.3, 751; 180/274; 49/502
See application file for complete search history.

(56) References Cited

U.S. PATENT DOCUMENTS

| | | | | |
|---|---|---|---|---|
| 4,434,580 A | * | 3/1984 | Engelsberger et al. | 49/502 |
| 4,702,040 A | * | 10/1987 | Hellriegel | 49/502 |
| 5,040,334 A | * | 8/1991 | Dossin et al. | 49/502 |
| 5,417,470 A | * | 5/1995 | Holt | 296/187.12 |
| 5,466,032 A | * | 11/1995 | Clausen et al. | 296/187.12 |
| 5,470,125 A | * | 11/1995 | Yamazaki | 296/146.6 |
| 5,599,057 A | * | 2/1997 | Hirahara et al. | 296/146.6 |
| 6,135,537 A | * | 10/2000 | Giddons | 296/146.6 |
| 6,196,619 B1 | * | 3/2001 | Townsend et al. | 296/146.6 |
| 6,231,112 B1 | * | 5/2001 | Fukumoto et al. | 296/146.5 |
| 6,415,636 B1 | * | 7/2002 | Fukumoto et al. | 70/208 |
| 6,764,124 B2 | * | 7/2004 | Tohda et al. | 296/96.12 |
| 6,923,492 B2 | * | 8/2005 | Okazaki et al. | 296/146.6 |
| 6,926,340 B2 | * | 8/2005 | Moriyama | 296/146.6 |
| 6,942,281 B2 | * | 9/2005 | Omori et al. | 296/187.1 |

(Continued)

FOREIGN PATENT DOCUMENTS

| | | |
|---|---|---|
| DE | 4342038 | 7/1994 |
| EP | 1439085 | 7/2004 |
| FR | 2207039 | 6/1974 |
| FR | 2846923 | 5/2004 |
| FR | 2928106 | 9/2009 |
| JP | 2007-216831 | 8/2007 |

(Continued)

OTHER PUBLICATIONS

ISA European Patent Office, Search Report of EP 09 01 5137, Jan. 22, 2010, Germany, 5 pages.

*Primary Examiner* — Kiran B. Patel
(74) *Attorney, Agent, or Firm* — Alleman Hall McCoy Russell & Tuttle LLP (57) ABSTRACT

There is provided a door structure for a vehicle. The door structure comprises an upper door hinge; a lower door hinge; a door main body having an upper hinge mounting portion at which the door main body is mounted with the upper door hinge and a lower hinge mounting portion at which the door main body is mounted with the lower door hinge; an outer impact bar disposed in the door main body and extending in a longitudinal direction of the vehicle; an inner impact bar disposed in the door main body and extending in a longitudinal direction of the vehicle; and a connecting bracket connecting the front end of the outer impact bar and the front end of the inner impact bar to the upper hinge mounting portion of the door main body.

11 Claims, 8 Drawing Sheets

U.S. PATENT DOCUMENTS

| | | | |
|---|---|---|---|
| 7,070,225 B2 * | 7/2006 | Herrmann | 296/146.6 |
| 7,172,238 B2 * | 2/2007 | Bodin et al. | 296/146.6 |
| 7,331,626 B2 * | 2/2008 | Yoshimoto et al. | 296/187.12 |
| 2008/0185850 A1 * | 8/2008 | Takaya et al. | 292/336.3 |
| 2009/0184501 A1 * | 7/2009 | Hirotani | 280/730.2 |

FOREIGN PATENT DOCUMENTS

| | | |
|---|---|---|
| WO | 0035696 | 6/2000 |
| WO | 2004014681 | 2/2004 |

* cited by examiner

FIG. 1

| 1 | ... | DOOR |
| 3 | ... | DOOR MAIN BODY |
| 4 | ... | DOOR INNER PANEL |
| 4e | ... | EXTENSION PORTION |
| 25 | ... | OUTER IMPACT BAR |
| 26 | ... | INNER IMPACT BAR |
| 27 | ... | CONNECTING BRACKET |

3···DOOR MAIN BODY
4···DOOR INNER PANEL
26···INNER IMPACT BAR

FIG. 6

3 ··· DOOR MAIN BODY
4 ··· DOOR INNER PANEL
4e ··· EXTENSION PORTION
13 ··· HINGE PILLARS
20 ··· INSTRUMENT PANEL MEMBER
25 ··· OUTER IMPACT BAR
26 ··· INNER IMPACT BAR
40 ··· BRACKET
40a ··· UPPER HINGE CONNECTING PORTION
40b ··· OUTER IMPACT BAR CONNECTING PORTION
40c ··· INNER IMPACT BAR CONNECTING PORTION
41 ··· SUBSTANTIALLY CLOSED SECTION

3 ··· DOOR MAIN BODY
4 ··· DOOR INNER PANEL
4e ··· EXTENSION PORTION
13 ··· HINGE PILLARS
20 ··· INSTRUMENT PANEL MEMBER
25 ··· OUTER IMPACT BAR
26 ··· INNER IMPACT BAR
40 ··· BRACKET
40a ··· UPPER HINGE CONNECTING PORTION
40b ··· OUTER IMPACT BAR CONNECTING PORTION
40c ··· INNER IMPACT BAR CONNECTING PORTION
α ··· UPPER HINGE MOUNTING PORTION

DOOR STRUCTURE FOR VEHICLE

FIELD OF THE INVENTION

This invention relates to a door structure for a vehicle comprising an outer impact bar and an inner impact bar, both of which are disposed in a door main body of the vehicle and extend in a longitudinal direction of the vehicle, wherein the inner impact bar is disposed above and inside of the outer impact bar.

BACKGROUND

Japanese Unexamined Patent Application Publication No. 2007-216831 discloses a door main body having a door outer panel and a door inner panel as a door structure for a vehicle. The door main body is provided with a pair of plated beltline reinforcements, both of which are disposed between the door outer panel and the door inner panel and extend in a longitudinal direction of the vehicle along the beltline of the door main body. Front ends of the beltline reinforcements are connected to each other via a reinforcing member that is disposed at a door hinge of the door main body. Further, an impact bar is provided below the beltline reinforcements (which function as an inner impact bar in this invention).

Although the pair of beltline reinforcements as disclosed above are just connected to each other at their front ends, the beltline reinforcements are not connected to the impact bar. Therefore, the beltline reinforcements and the impact bar independently absorb a load of a vehicle collision during a front collision or a side collision, which disadvantageously may not result in absorbing the load sufficiently during the vehicle collision.

This invention is made so as to address this problem. A purpose of this invention is to provide a door structure for a vehicle which is capable of inhibiting the door or a passenger compartment from being deformed during a vehicle collision, by transmitting the load of the vehicle collision not only to an inner impact bar but also to the outer impact bar (via a door hinge) during a front collision, and by transmitting the load of vehicle collision not only to an outer impact bar but also to the inner impact bar (via a connecting bracket) during a side collision.

SUMMARY

To achieve the above purpose, in accordance with an aspect of the invention, a door structure for a vehicle comprises: an upper door hinge; a lower door hinge; a door main body having an upper hinge mounting portion at which the door main body is mounted with the upper door hinge and a lower hinge mounting portion at which the door main body is mounted with the lower door hinge; an outer impact bar disposed in the door main body and extending in a longitudinal direction of the vehicle, a front end of the outer impact bar being disposed proximate to and outside of the upper hinge mounting portion; an inner impact bar disposed in the door main body and extending in a longitudinal direction of the vehicle, a front end of the inner impact bar being disposed proximate to and inside of the upper hinge mounting portion, wherein the inner impact bar is disposed above and inside of the outer impact bar; and a connecting bracket connecting the front end of the outer impact bar and the front end of the inner impact bar to the upper hinge mounting portion of the door main body.

According to the above configuration, both of the front end of the inner impact bar and the front end of the outer impact bar may be connected to the upper hinge mounting portion via the connecting bracket. Therefore, the load of vehicle collision may be transmitted not only to the inner impact bar but also to the outer impact bar (via a door hinge) during a front collision.

Also, this can further result in transmitting the load of the vehicle collision not only to the outer impact bar but also to the inner impact bar (via a connecting bracket) during a side collision.

As a result, load-withstanding performance of the door main body during a vehicle collision may be enhanced, and accordingly, deformation of the door or the passenger compartment during a vehicle collision may be inhibited.

In a preferable embodiment, the front end of the outer impact bar and the front end of the inner impact bar may overlap one another in a lateral direction of the vehicle, with the connecting bracket therebetween.

According to this embodiment, the load (of a vehicle collision) may be transmitted to both of the inner impact bar and the outer impact bar, in either case of a front collision or a side collision.

In a preferable embodiment, the outer impact bar may be disposed in a diagonal manner so as to connect the upper hinge mounting portion and a rear lower portion of the door main body, the inner impact bar may connect the upper hinge mounting portion and a rear portion of the door main body, and the inner impact bar may be upwardly inclined toward the rear portion.

In a further preferable embodiment, the outer impact bar may connect the upper hinge mounting portion and a rear lower portion of the door main body, and the inner impact bar may connect the upper hinge mounting portion and a rear upper portion of the door main body.

In a still further preferable embodiment, the outer impact bar may extend so as to be downwardly inclined toward a rear end of the door main body, and the inner impact bar may extend so as to be upwardly inclined toward a rear end of the door main body.

According to these embodiments, both impact bars may be disposed in a sideways V-shaped form in a side view, so that a vertical gap between the outer impact bar and the inner impact bar may be increased along a rearward direction. Therefore, the load of vehicle collision during front collision can be received over a wide area by both impact bars. Accordingly, load-withstanding performance of the door main body during front collision can be enhanced.

In a preferable embodiment, the connecting bracket may form a substantially closed section between the upper hinge mounting portion, the outer impact bar and the inner impact bar in a top view.

According to this embodiment, the load (of a vehicle collision) may be transmitted to both of the inner impact bar and the outer impact bar, due to the above substantially closed section.

In a preferable embodiment, the connecting bracket may comprise an upper hinge connecting portion to which the upper door hinge is connected, an outer impact bar connecting portion to which the outer impact bar is connected, and an inner impact bar connecting portion to which the inner impact bar is connected, wherein the outer impact bar connecting portion may extend rearward from an outside of the upper hinge connecting portion, the inner impact bar connecting portion may extend inward from a backside of the outer impact bar connecting portion, and the inner impact bar connecting portion may be inwardly inclined toward a rear end of the door main body.

During a side collision, the front end of the outer impact bar essentially tends to move rearward and inward while deforming, as the intermediate portion of the outer impact bar is bent inward. According to this embodiment, the inner impact bar connecting portion may extend so as to be inwardly inclined toward a rear end of the door main body, which may result in pushing against the front end of the outer impact bar moving rearward and inward. Therefore, as the front end of the outer impact bar may be inhibited from moving rearward and inward while deforming, the intermediate portion of the outer impact bar can be difficult to bend during the side collision. Accordingly, load-withstanding performance of the door main body during a side collision can be further enhanced.

In a preferable embodiment, the door main body may comprise an extension extending frontward from an outside of the upper hinge mounting portion, and the outer impact bar may be connected to both of the extension and the connecting bracket.

According to this embodiment, load-withstanding performance of the door main body during a vehicle collision can be further enhanced, as the outer impact bar may be connected to both of the extension and the connecting bracket.

In a preferable embodiment, the door structure may further comprise an instrument panel member extending in a lateral direction of the vehicle between hinge pillars, wherein the instrument panel member may be overlapped with the connecting bracket in a lateral direction of the vehicle.

According to this embodiment, at least one of the outer impact bar and the inner impact bar can ensure receiving the load of vehicle collision during a side collision, and transmitting the load to the instrument panel member through the connecting bracket. Therefore, load-withstanding performance of the door main body during a side collision can be enhanced.

According to the invention, the front end of the outer impact bar is disposed proximate to and outside of the upper hinge mounting portion, the front end of the inner impact bar is disposed proximate to and inside of the upper hinge mounting portion, and a connecting bracket connects both of the front ends to the upper hinge mounting portion of the door main body. Therefore, the load of vehicle collision may be transmitted not only to the inner impact bar but also to the outer impact bar (via the door hinge) during a front collision. Also, this can further result in transmitting the load of the vehicle collision not only to the outer impact bar but also to the inner impact bar (via a connecting bracket) during a side collision. Accordingly, deformation of the door or the passenger compartment during a vehicle collision may be inhibited.

DETAILED DESCRIPTION

In order to suppress deformation of a door and a vehicle cabin at the time of a collision of a vehicle, the following configuration is made for a door structure of the vehicle including an outer impact bar provided at an outer position in the vehicle width direction inside a door main body so as to tilt downwardly to the rear, and an inner impact bar provided in a beltline portion inside the door main body at an inner position in the vehicle width direction so as to extend in the front-and-rear direction.

A front end portion of the outer impact bar is arranged at the outer position in the vehicle width direction in the vicinity of an upper hinge mounting portion of the door. A front end portion of the inner impact bar is arranged at the inner position in the vehicle width direction close to the upper hinge mounting portion of the door. A connecting bracket for coupling both the front end portions and the upper hinge mounting portion is also provided.

Embodiment 1

Hereinafter, an embodiment according to the invention is explained in detail based on the appended drawings.

Figure 1:
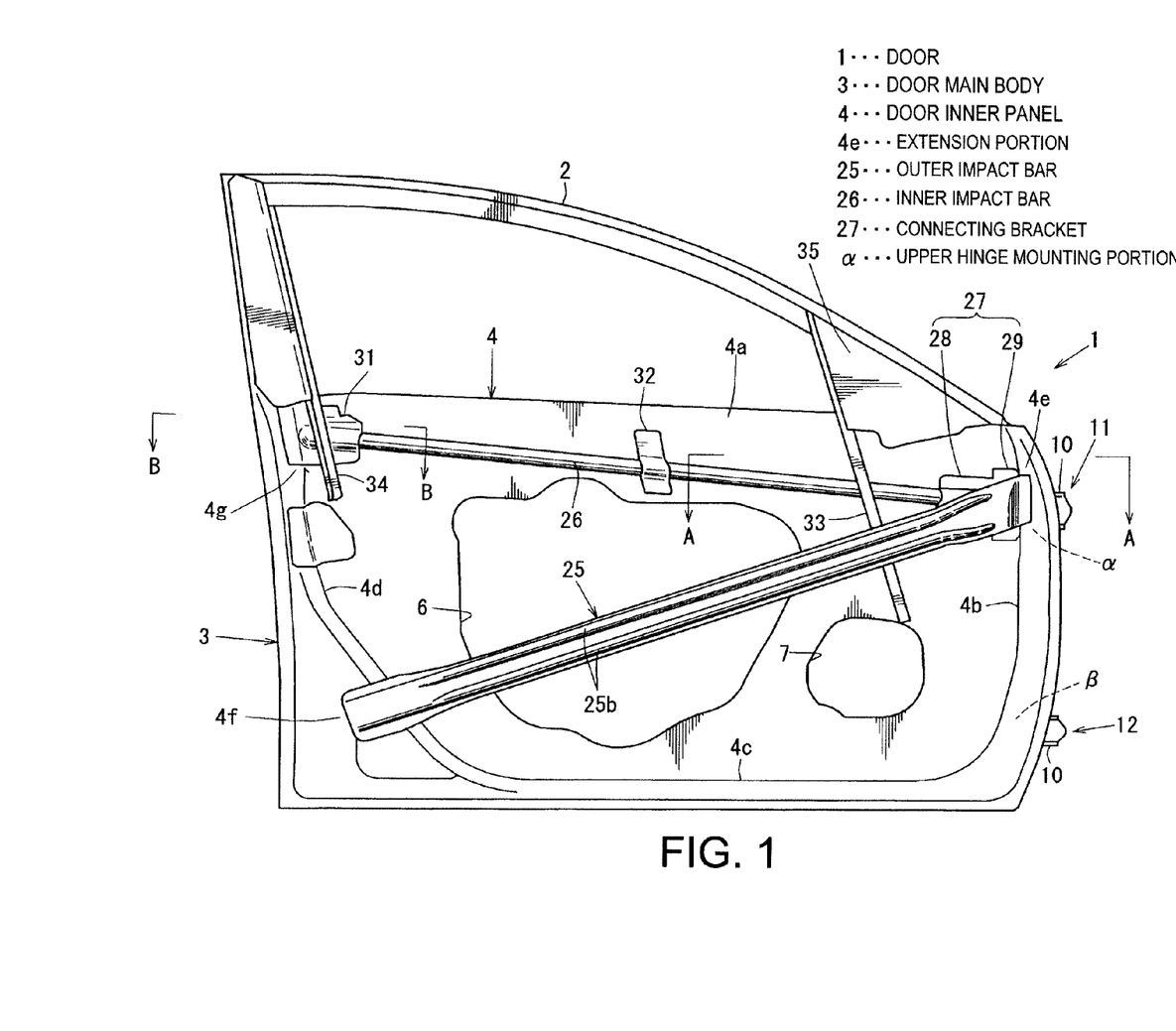
FIG. 1 is a side view seen from the outside of a vehicle, showing a door structure of the vehicle according to an embodiment of the invention, where a door outer panel is removed.
Figure 2:
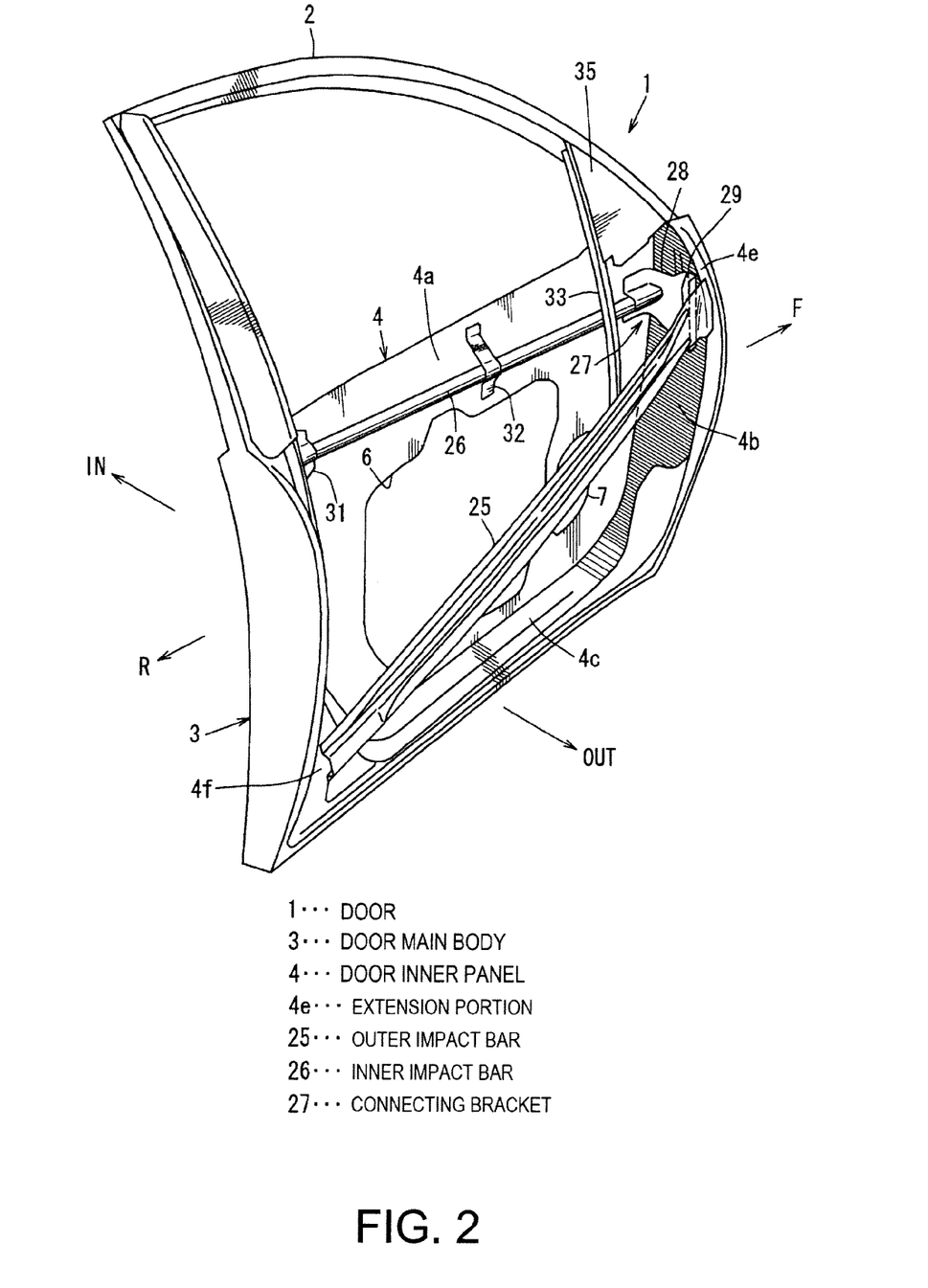
FIG. 2 is a perspective view of FIG. 1.
Figure 3:
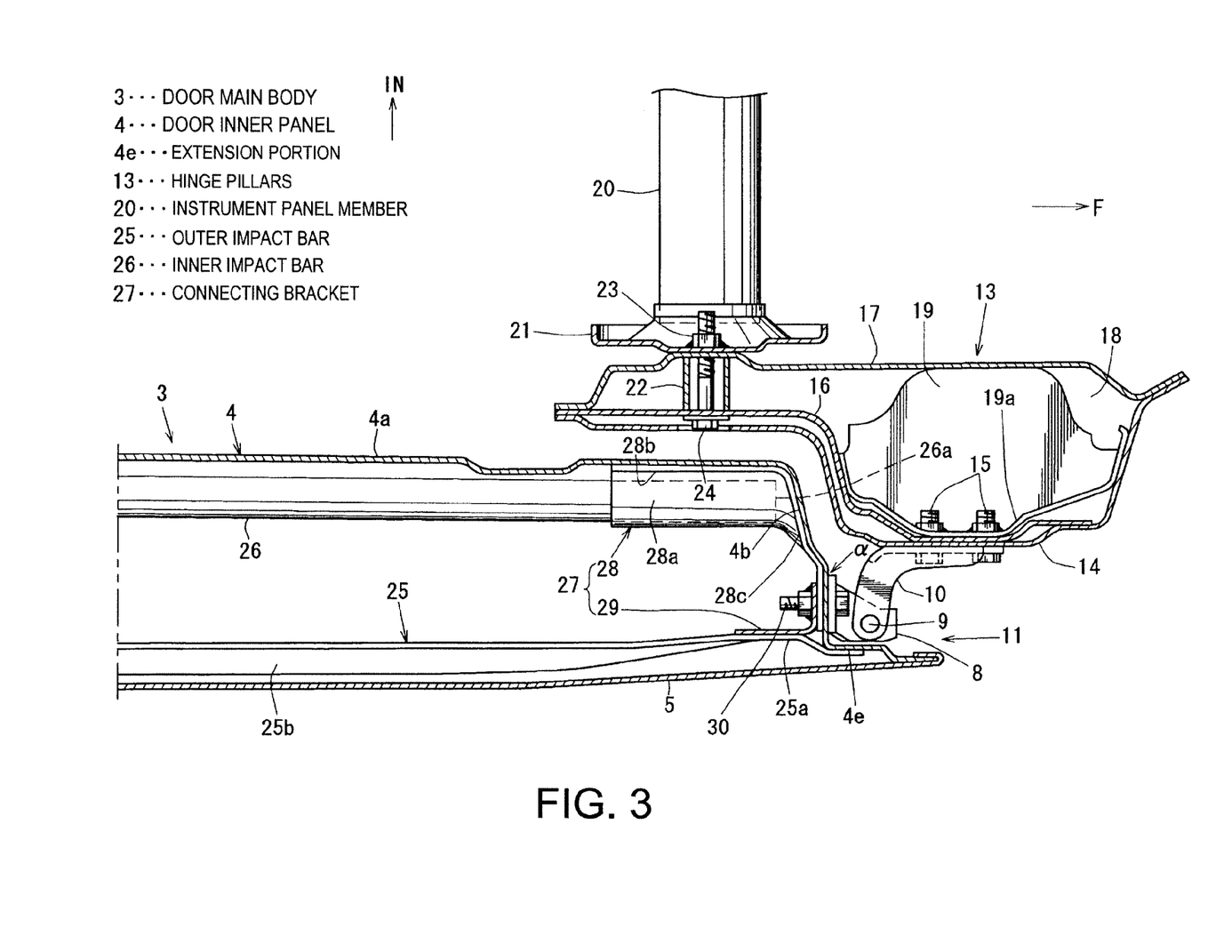
FIG. 3 is a cross-sectional view taken along the line A-A in FIG. 1.

The drawings show a door structure of a vehicle. FIG. 1 is a side view showing the door structure seen from the outside of the vehicle where a door outer panel is removed. FIG. 2 is a perspective view of FIG. 1. FIG. 3 is a cross-sectional view taken along the line A-A in FIG. 1 (in this drawing, the door outer panel is attached, and the structure on the side of the vehicle body is also illustrated).

In FIGS. 1 to 3, a door 1 of the vehicle (in these drawings, the right-side door of the vehicle is illustrated) includes a door sash portion 2 and a door main body 3.

The door main body 3 includes a door inner panel 4 located inwardly in the vehicle width direction, and a door outer panel 5 (refer to FIG. 3) located outwardly in the vehicle width direction, and both the panels 4 and 5 are integrated by hemming processing as shown in FIG. 3.

As shown in FIGS. 1 and 2, the door inner panel 4 includes an inner panel main plate portion 4a formed with an opening portion 6 for attaching a door module and an opening portion 7 for attaching a speaker, a front side portion 4b extending outwardly in the vehicle width direction from a front portion of the inner panel main plate portion 4a, a lower side portion 4c extending outwardly in the vehicle width direction from a lower portion of the inner panel main plate portion 4a, and a rear side portion 4d (refer to FIG. 5) extending outwardly in the vehicle width direction from a rear portion of the inner panel main plate portion 4a.

As shown in FIG. 1, an upper hinge mounting portion α and a lower hinge mounting portion β are provided in the front side portion 4b of the door inner panel 4. Door-side hinge brackets 8 are attached to both the upper and lower hinge mounting portions α and β, respectively. As shown in FIG. 3, the door-side hinge brackets 8 are coupled to vehicle-body-side hinge brackets 10 via hinge pins 9 so as to open and close, each of which constitutes an upper door hinge 11 and a lower door hinge 12.

Here, as shown in FIG. 3, each vehicle-body-side hinge bracket 10 is attached to a hinge pillar outer 14 in a hinge pillar 13 on the side of the vehicle body, using mounting members 15, such as bolts and nuts.

The hinge pillar 13 is a vehicle body rigid member provided with a hinge pillar closed section 18 extending in the up-and-down direction, which is formed by joining and fixing the hinge pillar outer 14, a hinge pillar reinforcement 16, and a hinge pillar inner 17. In this embodiment, a box-shaped hinge reinforcement 19 is coupled between the hinge pillar reinforcement 16 and the hinge pillar inner 17 in the hinge pillar closed section 18 to improve rigidity of the hinge pillar 13.

As shown in FIG. 3, the hinge reinforcement 19 includes a joining piece 19a on the outside of the vehicle. The vehicle-body-side hinge bracket 10, the hinge pillar outer 14, the hinge pillar reinforcement 16, and the joining piece 19a fastened and fixed together by the mounting members 15, such as the bolts and nuts described above, to improve support rigidity of the door 1 by the hinge pillar 13.

Further, as shown in FIG. 3, an instrument panel member 20 as a vehicle body reinforcement member extending in the vehicle width direction is bridged so as to be tensioned horizontally between the hinge pillar inners 17 in the left-and-right hinge pillars 13 (however, in the drawing, only the right hinge pillar 13 is shown).

In this embodiment, a flange 21 is joined and fixed to an end portion of the instrument panel member 20 in the vehicle width direction, and a collar 22 which is constituted by a rigid member is interposed between the hinge pillar reinforcement 16 and the hinge pillar inner 17 in the hinge pillar closed section 18. The instrument panel member 20 is bridged between the left-and-right hinge pillars 13 so as to be tensioned by fastening bolts 24 from the outside of the vehicle into nuts 23 joined and fixed to the flange 21 in advance.

Note that, more specifically, although two sets of upper and lower bolts 24 and nuts 23 are used, only the upper bolt 24 and nut 23 are shown in FIG. 3 for simplicity of the illustration.

As shown in FIGS. 1 to 3, an extension portion 4e extending forward in the vehicle is integrally formed with the front side portion 4b of the door inner panel 4, outside of the upper hinge mounting portion a in the vehicle width direction.

As shown in FIGS. 1 to 3, inside the door main body 3 including the door inner panel 4 and the door outer panel 5, an outer impact bar 25 that is located outwardly in the vehicle width direction and is provided so as to tilt downwardly to the rear, and an inner impact bar 26 that is located inwardly in the vehicle width direction inside the door main body 3 and extends in the front-and-rear direction along the beltline portion.

Figure 4:
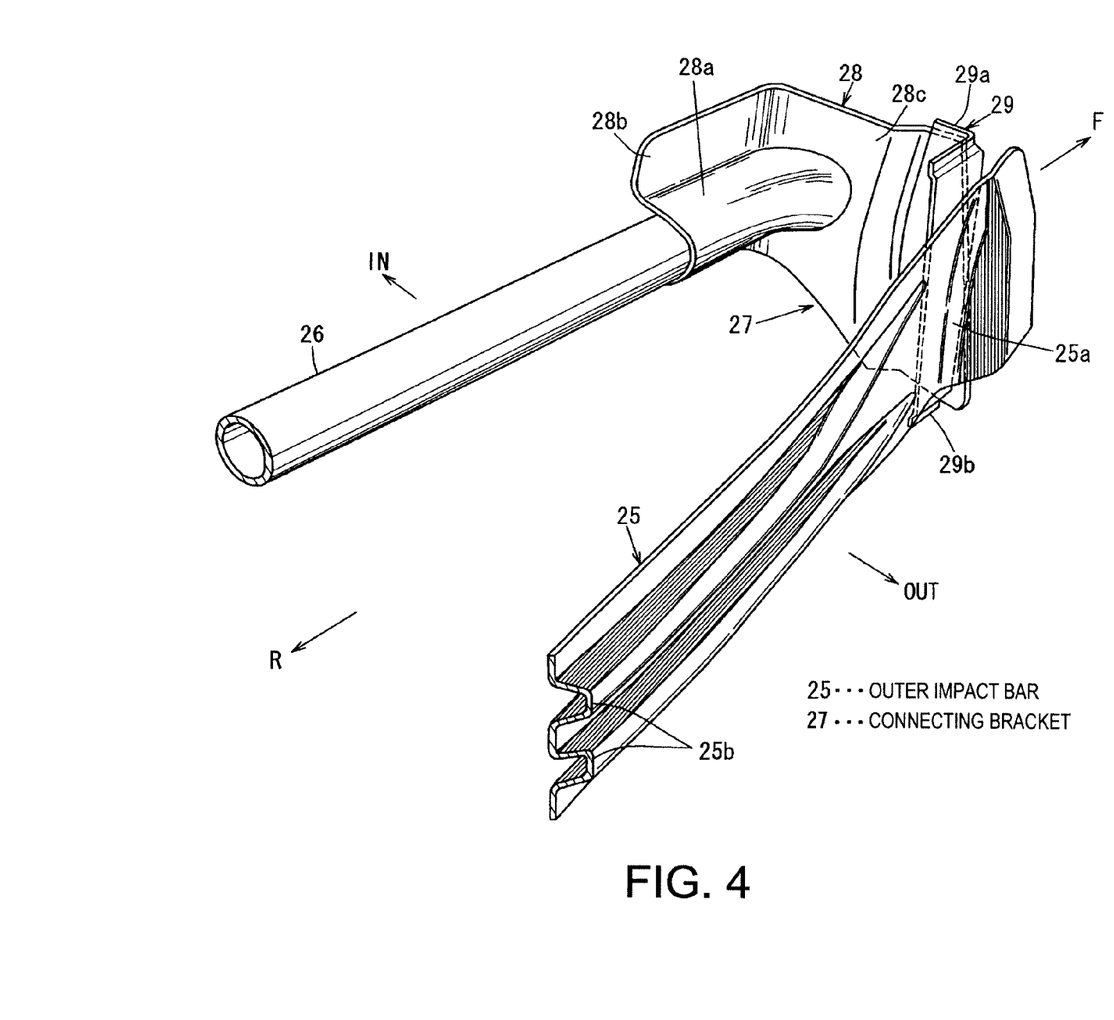
FIG. 4 is an enlarged perspective view of a substantial portion of FIG. 2.

As shown in FIGS. 3 and 4, the outer impact bar 25 has two lines of beads 25b extending in the longitudinal direction. A front end portion 25a of the outer impact bar 25 is arranged close to and outside of the upper hinge mounting portion a of the door 1 in the vehicle width direction. A front end portion 26a of the inner impact bar 26 is arranged close to and inside of the upper hinge mounting portion a of the door 1 in the vehicle width direction. Both the front end portions 25a and 26a and the upper hinge mounting portion α are coupled by a connecting bracket 27.

In this embodiment, the connecting bracket 27 is constituted by two members of a junction member 28 and a bracket 29 of an L-shape in the cross-section in the plan view.

As shown in FIG. 4 which is an enlargement of a substantial portion of FIG. 2, the inner impact bar 26 is formed by a rigid circular pipe. The junction member 28 is a rigid member that is obtained by integrally forming a holding portion 28a for holding the front end portion 26a of the inner impact bar 26 from the outside in the vehicle width direction, a joined portion 28b joined and fixed to the inner panel main plate portion 4a of the door inner panel 4, and a joined portion 28c joined and fixed to the front side portion 4b of the door inner panel 4.

The bracket 29 is a rigid member that is obtained by integrally forming a front portion 29a coupled to a joined portion 28c of the junction member 28 and a side portion 29b joined and fixed to the front end portion 25a of the outer impact bar 25, so as to be in an L-shape in the plan view.

As shown in FIG. 3, by using fastening members 30, such as bolts and nuts, the door-side hinge bracket 8, the front side portion 4b of the door inner panel 4, the joined portion 28c of the junction member 28, and the front portion 29a of the bracket 29 are fastened and fixed together. Thus, the front end portions 25a and 26a of both the impact bars 25 and 26 and the upper hinge mounting portion α are coupled to the connecting bracket 27 which is constituted with the junction member 28 and the bracket 29.

As shown in FIG. 3, in addition to the connecting bracket 27, the outer impact bar 25 is also coupled to an extension portion 4e integrally formed in the front side portion 4b of the door inner panel 4.

As shown in FIGS. 1 to 3, the front end portion 25a of the outer impact bar 25 and the front end portion 26a of the inner impact bar 26 are provided so as to overlap each other in the vehicle width direction, having the upper hinge mounting portion a therebetween.

As shown in FIGS. 1 and 2, the outer impact bar 25 is formed diagonally between the upper hinge mounting portion α and a rear lower portion of the door. That is, an impact bar mounting portion 4f is formed in a rear lower portion of the door inner panel 4. The outer impact bar 25 is arranged so as to be inclined downwardly from the upper hinge mounting portion a to the impact bar mounting portion 4f so that the front portion is higher and the rear portion is lower.

Figure 5:
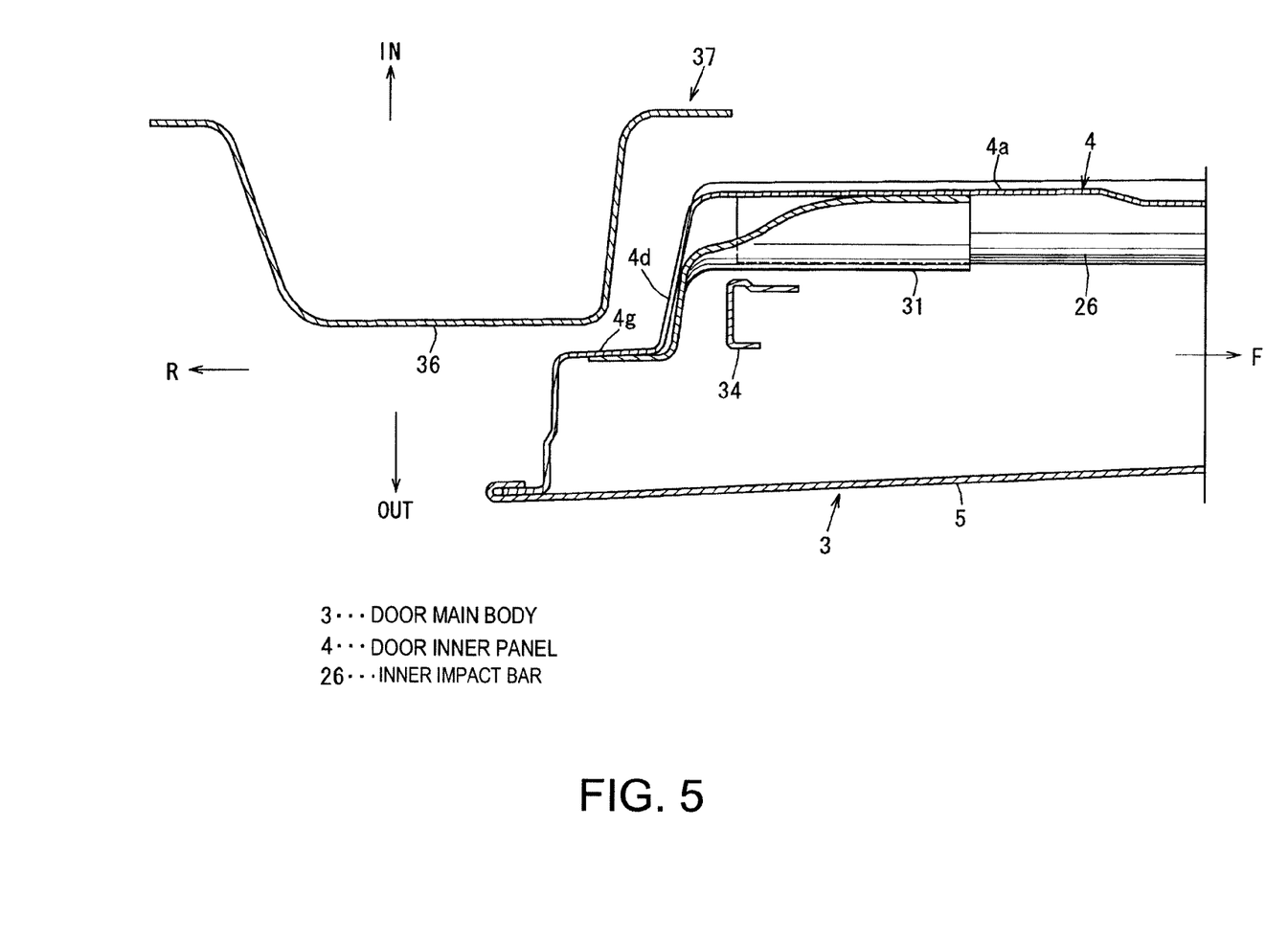
FIG. 5 is a cross-sectional view taken along the line B-B in FIG. 1.

As shown in FIG. 1, the inner impact bar 26 is provided so as to be inclined upwardly from the upper hinge mounting portion a toward the rear portion of the door. That is, as shown in FIG. 5 which is a cross-sectional view taken along the line B-B in FIG. 1, a stepped portion 4g extending rearwardly from the outer end of the rear side portion 4d of the door inner panel 4 in the vehicle width direction is integrally formed to the outer end. The rear end portion of the inner impact bar 26 inclined so as to have its front portion lower and its rear portion higher is attached to the rear portion inside of the door inner panel 4, using a bracket 31 provided over the inner panel main plate portion 4a, the rear side portion 4d, and the stepped portion 4g of the door inner panel 4. Therefore, the beltline inner impact bar 26 is provided so as to be inclined upwardly toward the rear portion of the door from the upper hinge mounting portion α.

As shown in FIGS. 1 and 2, an intermediate portion of the inner impact bar 26 in the front-and-rear direction is supported by the inner panel main plate portion 4a of the door inner panel 4 by using a rigid impact bar holder 32.

Meanwhile, the instrument panel member 20 is provided substantially at the same height position as the connecting bracket 27 to which the upper hinge mounting portion α is coupled so that it extends in the vehicle width direction between the left-and-right hinge pillars 13.

Note that, in the figures, reference numerals 33 and 34 indicate glass guides for guiding up and down of a window glass, and 35 indicates a corner bracket, and 36 indicates a center pillar outer that constitutes the center pillar 37. Further, in each of the figures, an arrow F indicates forward of the vehicle, an arrow R indicates rearward of the vehicle, an arrow IN indicates inward of the vehicle, and an arrow OUT indicates outward of the vehicle.

The illustrated embodiment is configured as described above, and its operation will be described below.

At the time of a front collision of the vehicle, the hinge pillar 13 moves rearwardly with respect to the entire vehicle body, the upper door hinge 11 then moves rearwardly, and then, the door main body 3 is moved to the rear. However, by the rear portion of the door main body 3 (for example, the rear side portion 4d in FIG. 5, a non-illustrated door latch, etc.) colliding with the center pillar 37, the rear movement is inhibited immediately. Therefore, if the hinge pillar 13 still moves rearwardly, the upper door hinge 11 and/or the connecting bracket 27 will be deformed. If the hinge pillar 13 further moves rearwardly, the hinge pillar 13 will hit the inner impact bar 26 via the door inner panel 4 and the connecting bracket 27 to transmit the load to the inner impact bar 26. Similarly, when the upper door hinge 11 moves rearwardly, the load is transmitted to the outer impact bar 25 and the inner impact bar 26 via the upper hinge mounting portion α and the bracket 29. By these, the improvement in an anti-front-collision capability can be achieved by load distribution, and the deformation of the door 1 and the vehicle cabin at the time of the front collision can be suppressed.

At the time of a side collision of the vehicle, the load is transmitted by the outer impact bar 25, and the load is also transmitted to the inner impact bar 26 via the connecting bracket 27 provided to the upper hinge mounting portion α. Further, the load is transmitted to the instrument panel member 20 bridged horizontally between the left-and-right hinge pillars 13, substantially at the same height position as the connecting bracket 27.

Therefore, improvement in an anti-side-collision capability can be achieved by load distribution, and deformation of the door 1 and the vehicle cabin at the time of the side collision can be suppressed.

Thus, the door structure of the vehicle in this embodiment shown in FIGS. 1 to 5 is a door structure of the vehicle including the outer impact bar 25 provided outwardly in the vehicle width direction inside the door main body 3 so as to be tilted downwardly to the rear, and the inner impact bar 26 provided to the beltline portion inwardly in the vehicle width direction inside the door main body 3 so as to extend in the front-and-rear direction. The front end portion 25a of the outer impact bar 25 is arranged close to and outside of the upper hinge mounting portion a of the door 1 in the vehicle width direction. The front end portion 26a of the inner impact bar 26 is arranged close to and inside of the upper hinge mounting portion a of the door 1 in the vehicle width direction. The connecting bracket 27 is provided for coupling both the front end portions 25a and 26a and the upper hinge mounting portion a (refer to FIGS. 1 and 3).

According to this configuration, the front end portion 26a of the inner impact bar 26 and the front end portion 25a of the outer impact bar 25 are coupled to the upper hinge mounting portion a by the connecting bracket 27. Therefore, at the time of a front collision, the load can be transmitted to the inner impact bar 26, and the load can also be transmitted to the outer impact bar 25 via the upper door hinge 11.

At the time of a side collision, the load can be transmitted by the outer impact bar 25, and the load can also be transmitted to the inner impact bar 26 via the connecting bracket 27.

As a result, improvement in an anti-collision capability can be achieved, and deformation of the door 1 and the vehicle cabin at the time of the vehicle collision can be suppressed.

The front end portion 25a of the outer impact bar 25 and the front end portion 26a of the inner impact bar 26 are provided so as to overlap each other on both sides of the connecting bracket 27 in the vehicle width direction (refer to FIGS. 1 and 3).

According to this configuration, the load transmission to both the impact bars 25 and 26 at the time of a front collision and a side collision can be ensured by interposing the connecting bracket 27.

The outer impact bar 25 is formed diagonally from the upper hinge mounting portion a to the rear lower portion of the door, and the inner impact bar 26 is provided so as to be inclined upwardly from the upper hinge mounting portion a toward the rear portion of the door (refer to FIG. 1).

According to this configuration, the arrangement structure of both the impact bars 25 and 26 becomes a lateral V-shape so that the vertical interval between both the impact bars 25 and 26 is expanded gradually from the front portion to the rear portion. Therefore, improvement in an anti-load capability can be achieved by receiving the front collision load in a wide span over both the impact bars 25 and 26.

In addition, the door inner panel 4 includes the extension portion 4e extending forward in the vehicle, outside of the upper hinge mounting portion a in the vehicle width direction, and the outer impact bar 25 is also coupled to the extension portion 4e in addition to the connecting bracket 27 (refer to FIG. 3).

According to this configuration, because the outer impact bar 25 is coupled to both of the connecting bracket 27 and the extension portion 4e of the door inner panel 4, further improvement in the anti-load capability can be achieved.

The instrument panel member 20 as the reinforcement member extending in the vehicle width direction is provided between the left-and-right hinge pillars 13 substantially at the same height position as the connecting bracket 27 for coupling the upper hinge mounting portion a (refer to FIG. 3).

According to this configuration, the impact load at the time of a side collision received by the side-collision impact bar 25 (and the front-collision beltline inner impact bar 26) can be certainly transmitted via the connecting bracket 27 to the instrument panel member 20 which is the reinforcing member and, thus, improvement in the anti-side-collision capability can be achieved.

Embodiment 2

Figure 6:
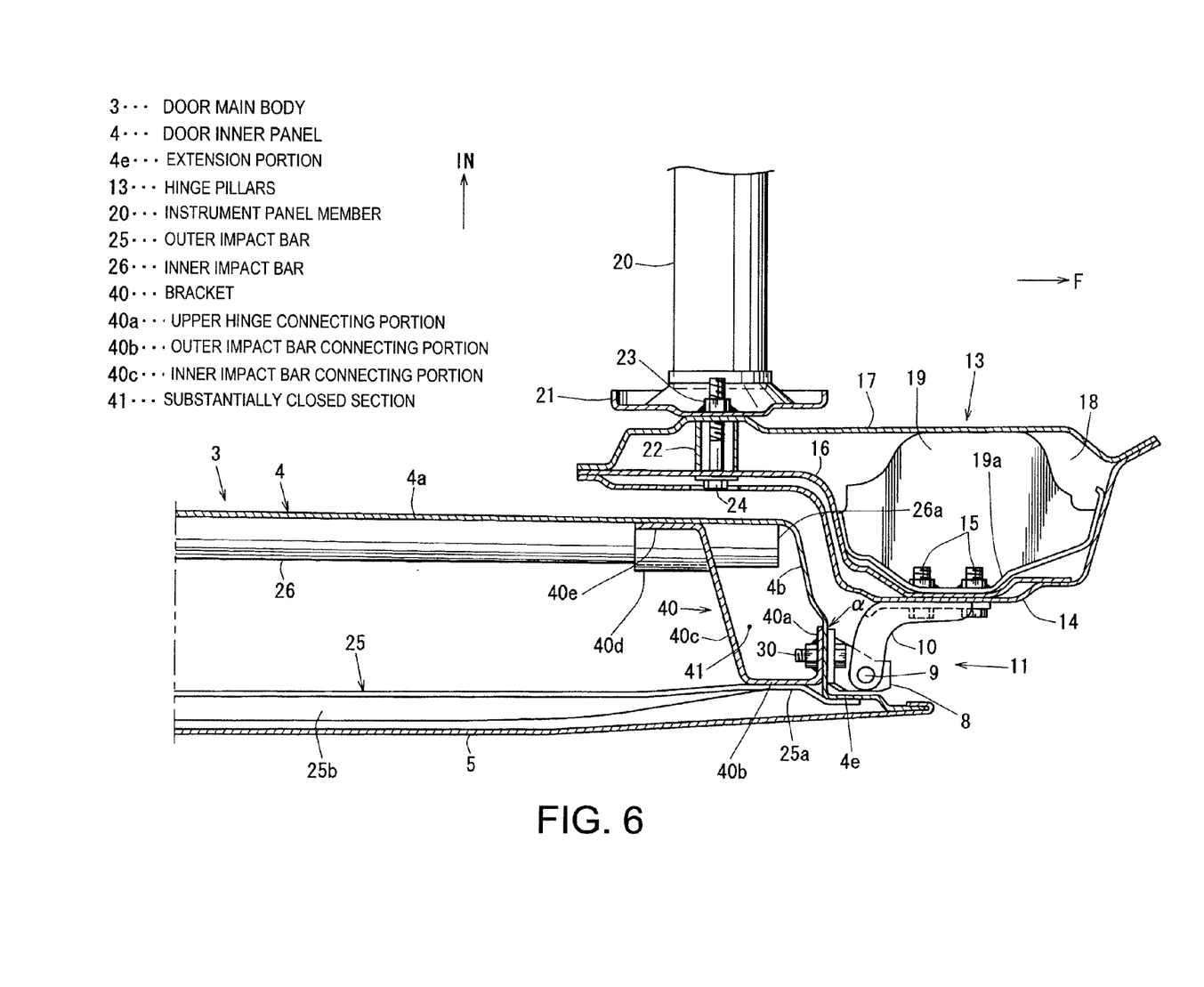
FIG. 6 is a plan view showing another embodiment of the door structure of the vehicle.
Figure 7:
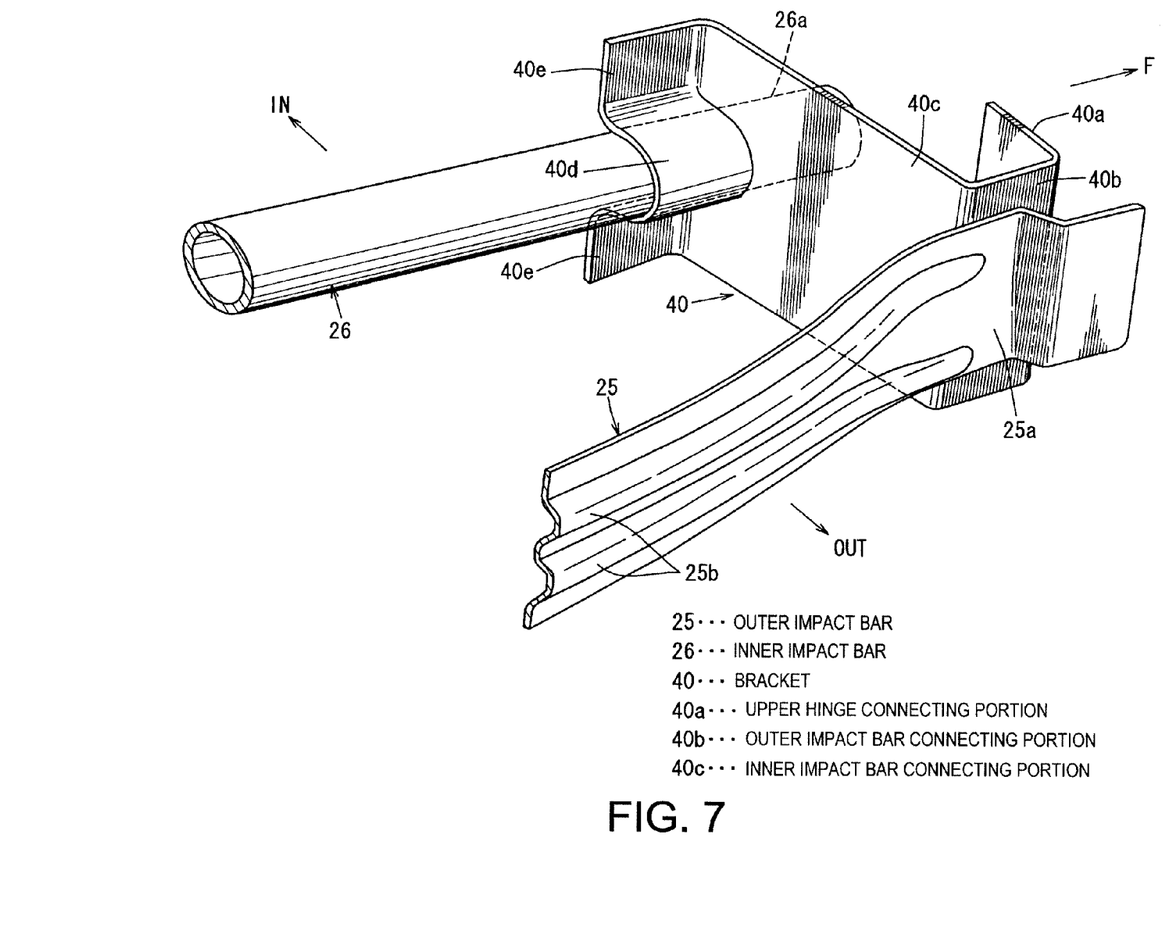
FIG. 7 is an enlarged perspective view of a substantial portion of FIG. 6.

FIGS. 6 and 7 show another embodiment of the door structure of the vehicle, where FIG. 6 is a plan view, and FIG. 7 is a perspective view of a substantial portion.

In the previous embodiment shown in FIGS. 1 to 5, although the connecting bracket 27 for coupling the respective front end portions 25a and 26a of both the impact bars 25 and 26 and the upper hinge mounting portion α is constituted by two portions, this embodiment shown in FIGS. 6 and 7 is constituted by one portion.

That is, as shown in FIGS. 6 and 7, a bracket 40 is provided for coupling the front end portion 25a of the outer impact bar 25 and the front end portion 26a of the inner impact bar 26, and the upper hinge mounting portion α.

This bracket 40 includes an upper hinge connecting portion 40a, an outer impact bar connecting portion 40b extending rearwardly from the outside of the upper hinge connecting portion 40a in the vehicle width direction, and an inner impact bar connecting portion 40c extending inwardly in the vehicle width direction from a rear portion of the outer impact bar connecting portion 40b.

The connecting portion 40c includes, in its inner end portion in the vehicle width direction, a holding portion 40d for holding the front end side of the impact bar 26, and a joined portion 40e coupled and fixed to the inner panel main plate portion 4a of the door inner panel 4.

As shown in FIG. 6, the inner impact bar connecting portion 40c is provided so as to be inclined rearwardly toward the inside in the vehicle width direction.

In addition, as shown in the plan view of FIG. 6, the bracket 40 is provided so as to form a substantially closed section 41 in the top view, surrounded by the upper hinge mounting portion α, the outer impact bar 25, and the inner impact bar 26.

By configuring as described above, at the time of a front collision of the vehicle, when the hinge pillar 13 moves rearwardly with respect to the entire vehicle body, the upper door hinge 11 then moves rearwardly, and then, the door main body 3 moves to the rear. However, when the rear portion of the door main body 3 (for example, the rear side portion 4d in FIG. 5 or a non-illustrated door latch, etc.) collides with the center pillar 37, the rear movement thereof is inhibited immediately. Therefore, when the hinge pillar 13 still moves rearwardly, the upper door hinge 11 and/or the connecting bracket 40 will be deformed. If the hinge pillar 13 further moves rearwardly, the hinge pillar 13 hits the front end of the inner impact bar 26 via the door inner panel 4 to transmit the load to the inner impact bar 26. When the upper door hinge 11 moves rearwardly, the load is applied to the bracket 40 to transmit the load to both the impact bars 25 and 26 via the bracket 40.

At the time of a side collision of the vehicle, the load is transmitted to the outer impact bar 25, and the load is also transmitted from the impact bar 25 to the inner impact bar 26 via the bracket 40. Therefore, the load is transmitted to the vehicle body by the inner impact bar 26 pushing the vehicle body (that is, the hinge pillar 13 and the instrument panel member 20).

The load is also transmitted to the instrument panel member 20 bridged horizontally between the left-and-right hinge pillars 13, substantially at the same height position as the bracket 40.

Thus, by achieving the improvement in the anti-collision capability by such load transmission and load distribution, deformation of the door 1 and the vehicle cabin at the time of the collision can be suppressed.

As described above, in the embodiment shown in FIGS. 6 and 7, the bracket 40 is provided so as to form substantially the closed section 41 in the top view surrounded by the upper hinge mounting portion α, the outer impact bar 25, and the inner impact bar 26 (refer to FIG. 6).

According to this configuration, by the structure of the substantially closed section 41, the load transmission to both the impact bars 25 and 26 can be certainly performed.

The bracket 40 includes the upper hinge connecting portion 40a, the outer impact bar connecting portion 40b extending rearwardly from the outside of the upper hinge connecting portion 40a in the vehicle width direction, and the inner impact bar connecting portion 40c extending inwardly in the vehicle width direction from the rear portion of the outer impact bar connecting portion 40b. The inner impact bar connecting portion 40c is provided so as to be inclined rearwardly toward the inside in the vehicle width direction (refer to FIG. 6).

According to this configuration, there are the following effects.

That is, at the time of a side collision, an intermediate portion of the outer impact bar 25 bends inwardly in the vehicle width direction, its front end portion tends to move rearwardly and inwardly in the vehicle width direction while being deformed. However, the inner impact bar connecting portion of the bracket 40 extends so as to be inclined rearwardly toward the inside in the vehicle width direction. This results in that it pushes back the front end portion of the outer impact bar 25 which is moving rearwardly and inwardly in the vehicle width direction. Thus, because the movement of the mounting portion of the outer impact bar 25 rearwardly and inwardly in the vehicle width direction at the time of the side collision while being deformed, is suppressed, the intermediate portion of the outer impact bar is easily bent at the time of the side collision. Therefore, improvement in the anti-load capability of the door main body can be achieved.

Also in the embodiment shown in FIGS. 6 and 7, because other configurations, operations, and effects are substantially similar to those of the previous embodiment, like portions in FIGS. 6 and 7 which are similar to those in the previous figures are given with like numerals, and the detailed description thereof is omitted.

Embodiment 3

Figure 8:
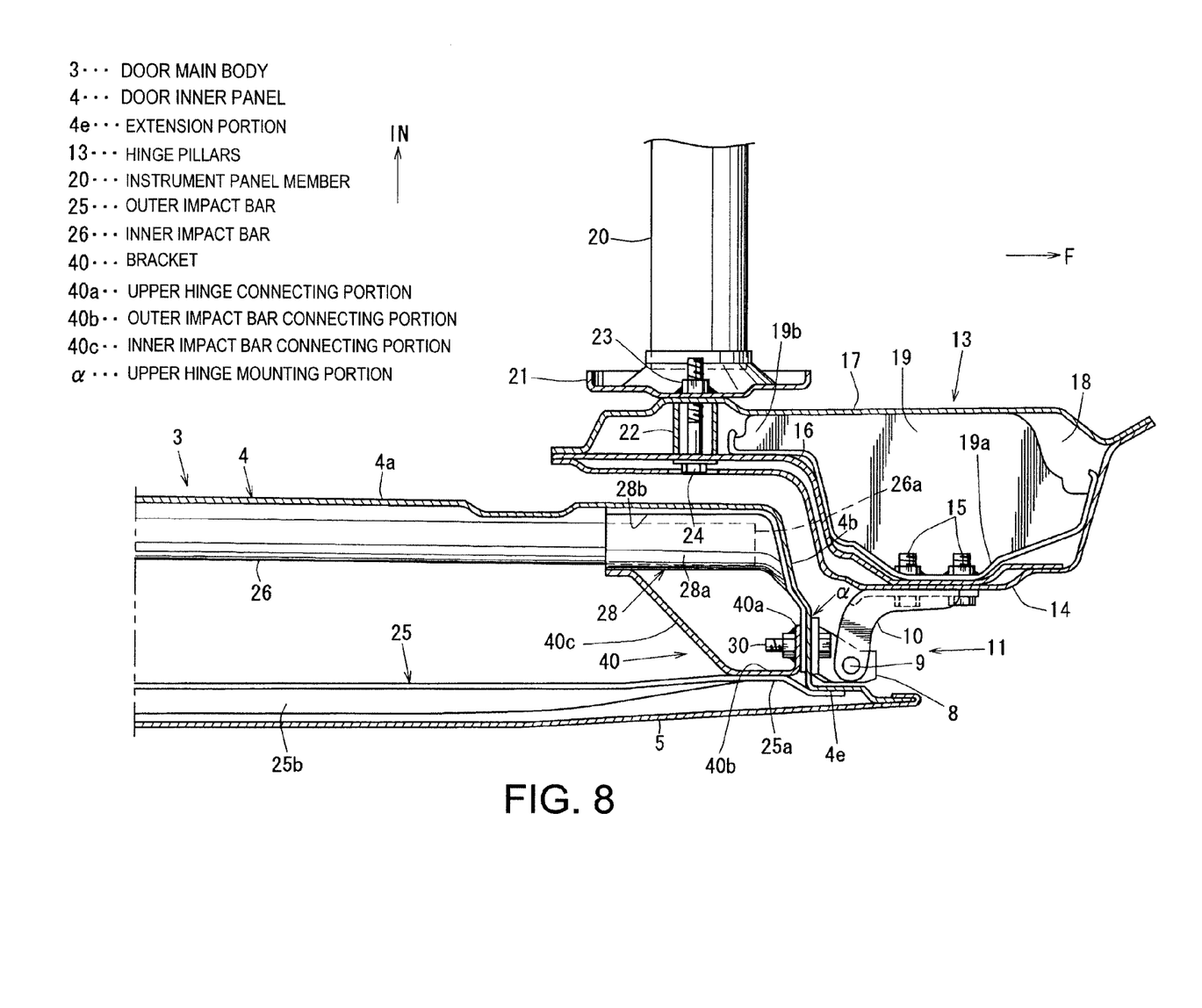
FIG. 8 is a plan view showing still another embodiment of the door structure of the vehicle.

FIG. 8 is a plan view showing still another embodiment of the door structure of the vehicle.

In this embodiment, a connecting bracket is configured for coupling the front end portions 25a and 26a of both the impact bars 25 and 26 and the upper hinge mounting portion a by using the junction member 28 of Embodiment 1 and the bracket 40 of Embodiment 2. The collar 22 penetrates through the hinge pillar reinforcement 16 inside the hinge pillar 13. This collar 22 is interposed between the hinge pillar outer 14 and the hinge pillar inner 17. Further, a hinge reinforcement installation portion 19b is integrally formed so that the hinge reinforcement 19 extends rearwardly up to a position corresponding to the instrument panel member 20 with respect to each of Embodiments 1 and 2.

By the extended structure of the hinge reinforcement 19 up to the position corresponding to the instrument panel member 20, further improvement in the anti-side-collision capability can be achieved.

Also in this embodiment shown in FIG. 8, because other configurations, operations, and effects are substantially similar to those of each previous embodiment, like portions in FIG. 8 to the previous figures are given with like numerals and, thus, detailed description thereof is omitted.

As for the correspondence of the configuration according to the invention to the above-described embodiments, although the connecting bracket according to the invention corresponds to the connecting bracket 27 constituted by the junction member 28 and the bracket 29 of Embodiment 1, corresponds to the bracket 40 of Embodiment 2, and corresponds to the junction member 28 and the bracket 40 on Embodiment 3, the present invention is not limited only to the configurations of the above-described embodiments.

Note that a door structure on the left side of the vehicle may be configured to be substantially symmetrical in the left-and-right direction to that on the right side described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A door structure for a vehicle comprising:
an upper door hinge;
a lower door hinge;
a door main body having an upper hinge mounting portion at which the door main body is mounted with the upper door hinge and a lower hinge mounting portion at which the door main body is mounted with the lower door hinge;

an outer impact bar disposed in the door main body and extending in a longitudinal direction of the vehicle, a front end of the outer impact bar being disposed proximate to and outside of the upper hinge mounting portion;

an inner impact bar disposed in the door main body and extending in a longitudinal direction of the vehicle, a front end of the inner impact bar being disposed proximate to and inside of the upper hinge mounting portion, wherein the inner impact bar is disposed above and inside of the outer impact bar; and a connecting bracket connecting the front end of the outer impact bar and the front end of the inner impact bar to the upper hinge mounting portion of the door main body.

2. The door structure according to claim 1 wherein, the front end of the outer impact bar and the front end of the inner impact bar overlap one another in a lateral direction of the vehicle, with the connecting bracket therebetween.

3. The door structure according to claim 1 wherein, the outer impact bar is disposed in a diagonal manner so as to connect the upper hinge mounting portion and a rear lower portion of the door main body, and the inner impact bar is disposed so as to connect the upper hinge mounting portion and a rear portion of the door main body, and is upwardly inclined toward the rear portion of the door main body.

4. The door structure according to claim 1 wherein, the outer impact bar is disposed so as to connect the upper hinge mounting portion and a rear lower portion of the door main body, and the inner impact bar is disposed so as to connect the upper hinge mounting portion and a rear upper portion of the door main body.

5. The door structure according to claim 1 wherein, the outer impact bar extends so as to be downwardly inclined toward a rear end of the door main body, and the inner impact bar extends so as to be upwardly inclined toward a rear end of the door main body.

6. The door structure according to claim 1 wherein, the connecting bracket is configured to form a substantially closed section between the upper hinge mounting portion, the outer impact bar and the inner impact bar in a top view.

7. The door structure according to claim 6 wherein, the connecting bracket comprises an upper hinge connecting portion to which the upper door hinge is connected, an outer impact bar connecting portion to which the outer impact bar is connected, and an inner impact bar connecting portion to which the inner impact bar is connected, and the outer impact bar connecting portion extends rearward from an outside of the upper hinge connecting portion, and the inner impact bar connecting portion extends inward from a backside of the outer impact bar connecting portion and is inwardly inclined toward a rear end of the door main body.

8. The door structure according to claim 1 wherein, the door main body comprises an extension extending frontward from an outside of the upper hinge mounting portion, and the outer impact bar is connected to both the extension and the connecting bracket.

9. The door structure according to claim 1 further comprising:

an instrument panel member extending in a lateral direction of the vehicle between hinge pillars, the instrument panel member being overlapped with the connecting bracket in a lateral direction of the vehicle.

10. The door structure according to claim 1 wherein, the outer impact bar is disposed so as to connect the upper hinge mounting portion and a rear lower portion of the door main body, the inner impact bar is disposed so as to connect the upper hinge mounting portion and a rear upper portion of the door main body, the door main body comprises an extension extending frontward from an outside of the upper hinge mounting portion, and the outer impact bar is connected to both the extension and the connecting bracket.

11. The door structure according to claim 1 wherein, the outer impact bar extends so as to be downwardly inclined toward a rear end of the door main body, and the inner impact bar extends so as to be upwardly inclined toward a rear end of the door main body, and further comprising:

an instrument panel member extending in a lateral direction of the vehicle between hinge pillars, the instrument panel member being overlapped with the connecting bracket in a lateral direction of the vehicle.

* * * * *